(12) United States Patent
Woollenweber

(10) Patent No.: US 6,739,845 B2
(45) Date of Patent: May 25, 2004

(54) COMPACT TURBOCHARGER

(76) Inventor: William E. Woollenweber, 3169 Camino Del Arco, Carlsbad, CA (US) 92009-7856

( * ) Notice: Subject to any disclaimer, the term of this patent is extended or adjusted under 35 U.S.C. 154(b) by 0 days.

(21) Appl. No.: 10/158,310

(22) Filed: May 30, 2002

(65) Prior Publication Data
US 2003/0223892 A1 Dec. 4, 2003

(51) Int. Cl.[7] .............................................. F04B 17/00
(52) U.S. Cl. ..................... 417/407; 60/608; 384/476; 384/448
(58) Field of Search ..................... 417/407; 384/476, 384/485, 536, 448; 60/608

(56) References Cited

U.S. PATENT DOCUMENTS

| 3,056,634 | A | | 10/1962 | Woollenweber, Jr. et al. | |
|---|---|---|---|---|---|
| 3,096,126 | A | | 7/1963 | Woollenweber, Jr. et al. | |
| 3,390,926 | A | | 7/1968 | Woollenweber, Jr. | |
| 3,743,368 | A | * | 7/1973 | Elkins et al. | 384/485 |
| 3,876,266 | A | * | 4/1975 | Rozentals | 384/536 |
| 3,993,370 | A | | 11/1976 | Woollenweber | |
| 4,116,502 | A | * | 9/1978 | Horler et al. | 417/407 |
| 4,364,717 | A | | 12/1982 | Schippers et al. | |
| 4,370,106 | A | | 1/1983 | Lauterbach | 417/407 |
| 4,641,977 | A | | 2/1987 | Woollenweber | 417/407 |
| 4,721,441 | A | * | 1/1988 | Miyashita et al. | 417/407 |
| 4,907,952 | A | * | 3/1990 | Inoue et al. | 417/407 |
| 5,028,150 | A | * | 7/1991 | Kronenberger et al. | 384/476 |
| 5,076,766 | A | * | 12/1991 | Gutknecht | 417/407 |
| 5,150,973 | A | * | 9/1992 | Masur et al. | 384/448 |
| 5,771,695 | A | | 6/1998 | Halimi | 60/608 |
| 5,906,098 | A | | 5/1999 | Woollenweber et al. | |
| 6,305,169 | B1 | * | 10/2001 | Mallof | 60/608 |

FOREIGN PATENT DOCUMENTS

| CH | 622589 | A5 | * | 4/1981 | ................. 417/407 |
|---|---|---|---|---|---|
| JP | 61178522 | A | * | 8/1986 | ................. 417/407 |
| SU | 767471 | | | 11/1978 | ................. 417/407 |

* cited by examiner

Primary Examiner—Thomas Denion
Assistant Examiner—Thai Ba Trieu
(74) Attorney, Agent, or Firm—Greer, Burns & Crain, LTD

(57) ABSTRACT

A turbocharger comprising two closely spaced ball bearings that does not require lubricating oil from an engine. The bearing housing forms a cooling jacket with two bearing engagement surfaces engaged with the outer races of the ball bearings through an intermediate radial spring. Closely spacing the ball bearings provides a rotor shaft of minimal length. In addition, an external motor-generator may be by mounted on the turbocharger, with the motor rotor solidly connected to the turbocharger rotor. In such an assembly, an electronic control is energizes the motor from battery power during acceleration up to approximately torque peak speed; thereafter, the control changes to a generator mode when there is excess energy in the engine exhaust gas.

19 Claims, 2 Drawing Sheets

COMPACT TURBOCHARGER

I. TECHNICAL FIELD OF THE INVENTION

This invention relates to turbochargers that have rotor assemblies that rotate at high speed and are used on internal combustion engines where the turbine component of the rotor is driven by high temperature exhaust gas.

II. BACKGROUND ART

Turbochargers are produced currently in the millions per year for use on both gasoline and diesel engines. Small units used on passenger car diesel and gasoline engines have been designed to reduce the rotor inertia and minimize turbocharger rotor lag during engine acceleration.

Much effort was expended in the early years of turbocharger development to produce a bearing system that exhibited sufficient durability to make a small size turbocharger commercially viable. Bearing systems for small turbochargers run at very high speeds, some exceeding 200,000 rpm, must be capable of mass production manufacturing methods, be low in cost, and easily serviced in the field.

Research and development during the 1960's resulted in the perfection of lubricated floating sleeve-bearing systems that were capable of suppressing the problems of shaft instability, had acceptable friction losses and achieved satisfactory durability when used on a variety of internal combustion engine turbochargers. Several of these successful bearing systems are illustrated in U.S. Pat. Nos. 3,056,634; 3,096,126; 3,390,926; 3,993,370; and 4,641,977. The bearings of the patents listed above generally solved the stability problem by using a free-floating bushing between the rotating shaft and its stationary supporting member with films of lubrication between its inner surface and the rotating shaft and also between its outer surface and the stationary supporting member. In these systems, the free-floating bushings were free to rotate, but at speeds only a fraction of the speed of the rotating shaft and were free to move radially in order to allow the rotating assembly to find and rotate about its center of mass, and the inner and outer oil films provided the necessary lubrication to prevent wear and provided a cushion against vibration and shock loads.

In the sleeve bearing systems described above, it was necessary to provide a thrust bearing to sustain the axial loads imposed on the rotating assembly by the actions of the compressor and turbine wheels used in the turbochargers, and a collar was provided on the rotating shaft to bear against a stationary thrust member. However, the high rotational speed of the collar attached to the shaft resulted in a high thrust frictional loss which, in addition to the frictional losses of the sleeve bearings, resulted in a substantial total frictional loss for the complete bearing system. Such high frictional losses substantially reduce the mechanical efficiency of turbochargers, and it has long been desirable to use anti-friction bearings.

U.S. Pat. No. 4,370,106 discloses a lubricated bearing system for a turbocharger rotor consisting of an anti-friction ball bearing at its compressor end and a sleeve bearing at its turbine end. In this system, both the anti-friction bearing and the sleeve bearing are mounted in a non-rotating elongated cylinder. The cylinder containing the ball bearing and sleeve bearing is prevented from rotating by a square portion at the compressor end that engages stops in the stationary housing member. Lubricant is provided between the non-rotating cylinder and the supporting housing to provide damping for eccentric motion of the rotor due to residual imbalance. In this bearing system, however, the differential speed between the sleeve bearing and rotor is the very high rotative speed of the rotor. Since sleeve bearing frictional losses are proportional to the square of the differential rotating speed, this system has an inherent higher frictional loss than a full-floating sleeve bearing system. Also, since the non-rotating cylinder that contains the bearings must engage the stationary housing member, it carries the full thrust load of the rotor. The residual imbalance in the rotor forces the non-rotating cylinder to move orbitally, causing the mating surfaces to be subject to fretting. Thus a solid film lubricant must be placed between the mating surfaces to mitigate the fretting problem; however, this problem remains an inherent disadvantage with this type of non-rotating cylinder system and contributes to a limited service life in the field.

The fretting problem inherent with non-rotating systems that are allowed to move radially is solved in the lubricated bearing system disclosed in U.S. Pat. No. 4,641,977. In this bearing system, a ball bearing is mounted in an elongated cylinder that has a radially extending flange at one end. The elongated cylinder is lubricated and free to move radially to a limited degree and free to rotate in the stationary supporting member. The radially extending flange engages the stationary housing to carry the thrust load of the rotor. However, since the elongated cylinder rotates at relatively low speeds, the thrust losses are minimal. In this bearing system, a lubricated free-floating sleeve bearing is located at the opposite end of the elongated cylinder to complete the bearing system of carrying the rotor. The frictional losses with this system are reduced due to the ball bearing and floating sleeve bearing; thus, the mechanical efficiency of the system is relatively high compared to prior bearing systems.

My pending U.S. patent application Ser. No. 09/978,935, discloses a lubricated bearing system employing two angular contact ball bearings mounted in a rotating sleeve that achieves both low friction losses and excellent rotor stability.

Thus, commercial turbochargers have, for years, used engine lubricating oil fed to the turbocharger bearings to achieve rotor stability and satisfactory durability. This necessitates the design of sealing devices between the turbocharger rotating shaft and the bearing housing to prevent oil leakage into the compressor chamber, and into the turbine chamber where the oil can become carbonized due to the high temperature environment in the turbine component of the machine.

Oil leakage in turbochargers has been a persistent problem and a completely satisfactory solution has yet to be found. The small ring seals now used in commercial turbochargers to confine the bearing lubrication must allow some running clearance to eliminate friction and wear; thus, they cannot be totally leak free during some engine operating conditions. For example, when the engine is running at low idle speeds and when a vacuum exists in the air intake system due to the pressure drop across the air cleaner, there is a tendency for oil leakage to occur into the compressor chamber which can subsequently be carried into the engine air intake manifold. Thus, it would be desirable to eliminate the use of lubricating oil in turbochargers in order to totally eliminate the problem of oil leakage in turbochargers.

In addition, electric motor-assisted turbochargers are well known and have been proven to help overcome the turbo lag problem, improve engine performance, and reduce smoke and emissions during the engine acceleration period. The electric generating capability of such electric motor-assisted turbochargers has the potential for eliminating the waste gates used on commercial turbocharged engines and can be utilized to feed electric current back into the vehicle's electric system. However, prior motor-assisted turbocharger systems have suffered from certain deficiencies and complications.

III. BRIEF SUMMARY OF THE INVENTION

This invention provides for the use of anti-friction ball bearings in a unique arrangement, does not require the use of lubricating oil from the internal combustion engine lubricating system and permits close coupling of the bearings and a compact turbocharger.

In this invention, a turbocharger bearing housing forms a coolant water jacket with an inner bearing engaging portion that has two bearing engagement surfaces engaged with the outer races of two anti-friction ball bearings whose inner races carry the rotating shaft, turbine and compressor of the turbocharger. The anti-friction ball bearings are, preferably, angular contact ball bearings, and the two bearing engagement surfaces of the bearing housing are closely spaced, for example, a length of about the axial length of the compressor wheel or less, providing a turbocharger shaft of minimal length and substantially reducing the thermal expansion of the shaft. In the invention the coolant water jacket protects the anti-friction ball bearings from exposure to the extreme heat of the exhaust gas driven turbine, notwithstanding their increased proximity due to the shortened turbocharger shaft, and the bearing housing may be thinned, or otherwise adapted at the two bearing engagement surfaces for increased protection of the anti-friction ball bearings by the coolant water jacket.

The invention also overcomes the problems and complications of motor-assisted turbocharger systems by providing an economical combination of a motor-generator with a compact turbocharger that combines all the essential elements of a motor-assisted turbocharger in a single compact device. In the invention an external motor-generator is carried by the compact turbocharger and its motor is connected to the turbocharger rotor assembly by a permanent, solid connector and stays connected throughout the entire operating range of the turbocharger. The electronic motor-generator control is mounted on the motor housing and energizes the motor from battery power during the engine acceleration period up to approximately the torque peak speed; thereafter, the control changes to a generator mode when excess energy is available in the engine exhaust gas. Mounting the electronic control on the motor housing through which engine intake air is ducted allows a very short connection between motor and controller, and effective cooling of the control elements and the motor windings.

IV. BRIEF DESCRIPTION OF THE DRAWING

V. BEST MODE FOR CARRYING OUT THE INVENTION

Figure 1:
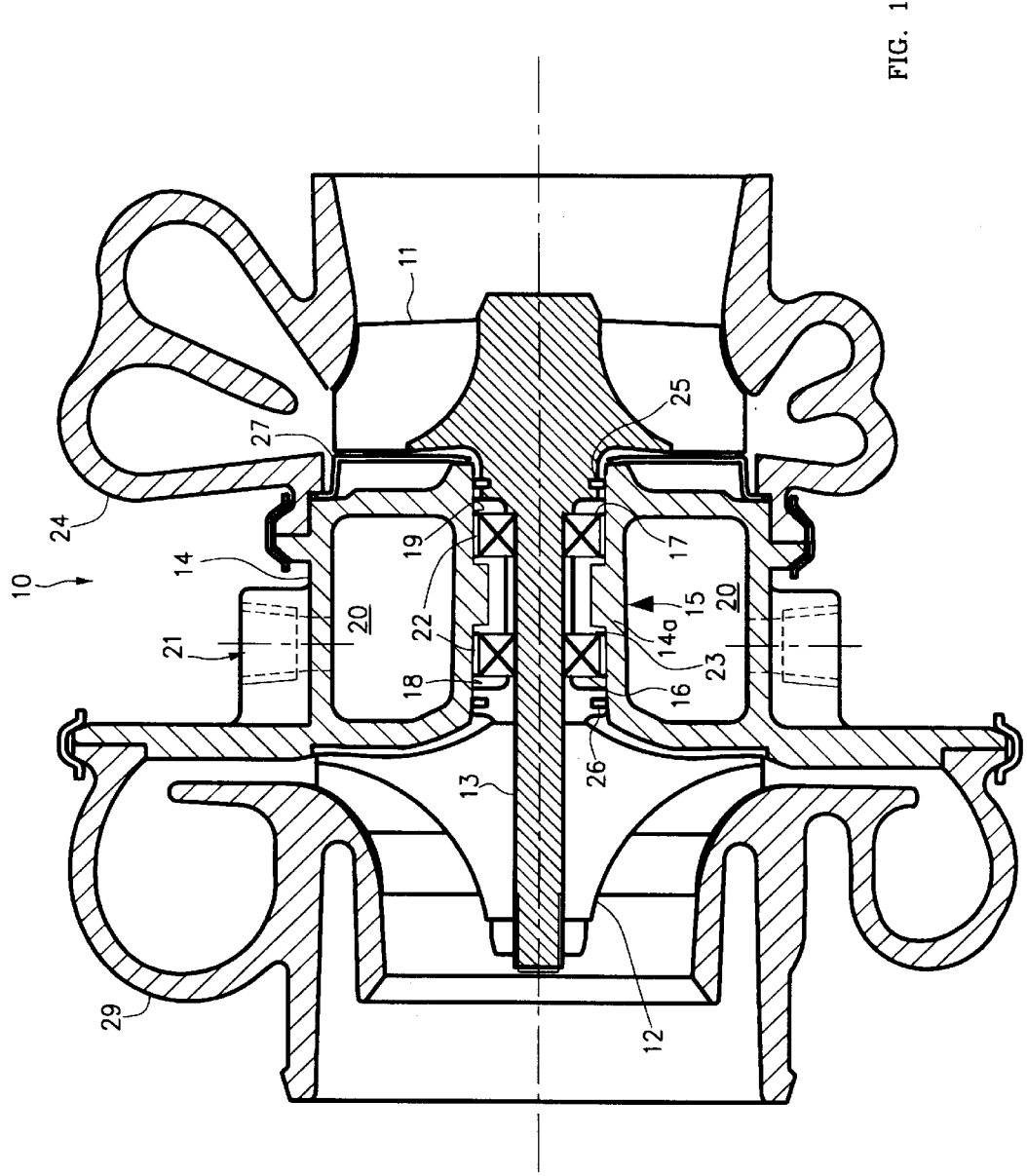
FIG. 1 is a cross-sectional view taken along a plane through the axis of rotation of a compact turbocharger of this invention.

The invention, as illustrated in FIG. 1, provides a compact turbocharger 10 including an exhaust gas-driven turbine wheel 11 and a compressor wheel 12 on a rotatable shaft 13 carried by a bearing housing 14 and bearing system 15 that includes a pair of anti-friction ball bearings 16, 17.

The bearing housing 14 comprises an inner bearing-engaging portion 14a with two bearing engagement surfaces 18, 19 for engagement with the outer races of the anti-friction ball bearings 16, 17. As illustrated in FIG. 1, the bearing housing 14 forms a coolant water jacket 20 for cooling the two bearing engagement surfaces 18, 19 and maintaining satisfactory operating temperatures of the anti-friction ball bearings 16, 17. The bearing housing 14 has an inlet 21 for coolant that may be connected with the coolant system of an internal combustion engine so engine coolant may be circulated through the coolant water jacket 20 of the turbocharger. Thus, the bearing housing 14 contains a coolant water jacket 20 that surrounds the anti-friction ball bearings 16, 17 and protects the bearings from the high temperatures present in the turbine portion of the turbocharger.

The bearing arrangement comprises one angular contact anti-friction ball bearing 17 at the turbine end installed to carry the rotor thrust load when the thrust load is toward the compressor 12. Another angular contact anti-friction ball bearing 16 at the compressor end is installed to carry the rotor thrust when the load is toward the turbine 11. Each anti-friction ball bearing 16, 17 is mounted with a radial spring 22, between its outer race and one of the bearing engagement surfaces 18, 19. These radial springs 22 allow axial movement of the outer race when axial expansion of the shaft occurs. This bearing arrangement permits the two anti-friction ball bearings 16, 17 to be closely spaced or coupled, a spacing as short as the axial length of the compressor wheel 12, and permits a substantial reduction in the length of the rotatable shaft 13. In the invention such anti-friction ball bearings can be closely spaced the minimal distance necessary for rotational stability in the face of rotor imbalance, and for the provision of an adequately protective coolant water jacket. The resulting close coupling of the anti-friction ball bearings 16, 17 and reduced length of turbocharger shaft 13 results in reduced axial shaft expansion. A small axial clearance is provided at 23 where the compressor end anti-friction ball bearing 16 is allowed to move toward the turbine 11 if the thrust load is great enough to move it in the bore of the bearing housing 14. The radial springs 22 allow this axial movement while restraining the outer races of the anti-friction ball bearing 16, 17 from turning in the bearing engagement surfaces 18, 19 during high speed operation.

The turbocharger 10, as shown in FIG. 1, may be, for example, used on a diesel or gasoline internal combustion engine. The turbine wheel 11 is driven by hot engine exhaust gas which transmits power to the compressor wheel 12 which, in turn, compresses intake air and delivers it to the intake manifold system of the engine.

To keep the bearings and internal parts of the turbocharger at reasonable operating temperatures, the bearing housing 14 incorporates a coolant water jacket 20, supplied with coolant from the engine cooling system. Thus, heat transferred from the hot turbine casing 24 and turbine back plate 27 into the bearing housing 14 is carried away by the coolant, maintaining acceptable bearing operating conditions.

In another embodiment of the invention, the anti-friction ball bearings 16, 17 may also be of the deep groove type that are capable of carrying thrust in both directions. However, angular contact bearings that carry thrust in one direction only are less expensive than the deep groove type.

The anti-friction ball bearings 16, 17 are preferably of the angular contact type, carrying a full complement of grease-lubricated ceramic balls. This type does not require a cage to separate the balls, therefore, more balls can be used in a given size bearing. Also, they are capable of higher rotating speeds since the cages used in conventional bearings are subjected to high centrifugal forces at the high rotating speeds required of turbocharger rotor assemblies. A piston ring seal 25 is employed to prevent hot gas from entering the bearing cavity and a second piston ring seal 26 prevents compressed air from entering the bearing cavity.

As stated previously, the preferred bearing type is a full complement, angular contact anti-friction ball bearing with grease-lubricated ceramic balls. There are specially formulated high temperature greases available that can withstand temperatures of over 500° F. for short periods; thus, they can withstand the conditions associated with a hot shutdown of the turbocharger. Due to the water-jacketed bearing housing, the normal temperatures of operation are expected to be somewhat less than 300° F., which is a safe operating range for grease lubrication. Thus, the use of engine lubricating oil in the new compact turbocharger design of this invention becomes unnecessary. Solid film lubricants are an additional option as a substitute for grease in the bearings.

The simplicity of the bearing system of this invention is evident when compared with conventional turbochargers that use oil-lubricated, full floating sleeve bearings and a separate, stationary thrust bearing. The bearings are protected from high temperature by a coolant water jacket in the bearing housing, permitting the use of anti-friction ball bearings without the use of engine oil-lubrication. A preferred embodiment of the invention embodies two angular contact anti-friction ball bearings in a close coupled arrangement. This allows the rotor shaft to be of minimal length which minimizes axial expansion of the shaft when the turbine is running at high temperature. The angular contact anti-friction ball bearings are mounted in a water-cooled bearing housing with radial springs in between the outer races and bearing engagement surfaces of the bearing housing. These springs allow for some minor misalignment and a minor amount of axial movement when the turbine is running on hot engine exhaust gas and the shaft expands axially. The radial springs also prevent the outer races from rotating in the housing bore.

The coolant water jacket in the bearing housing insulates the bearings and springs from the turbine heat. A piston ring seal on the shaft prevents hot gas from entering the bearing cavity. A second piston ring seal prevents compressed air from the compressor casing from entering the bearing cavity. A turbocharger of the invention, such as illustrated in FIG. 1, is more economical to manufacture than current commercial turbochargers.

In summary, the advantages of a turbocharger utilizing the bearing system of this invention are:

1. Mechanical efficiency is maximized due to the low friction loss in anti-friction ball bearings.
2. Turbocharger size is reduced due to the close-coupled anti-friction ball bearings, which also results in less axial expansion of the shaft and reduces material use in the shaft and bearing housing.
3. The elimination of the use of engine lubricating oil eliminates the oil leakage problems associated with conventional turbochargers.
4. Excellent thermal insulation due to the coolant water jacket between the hot (turbine) end and cool (compressor) end of the turbocharger produces low operating temperature conditions for the bearings and piston ring seals when the turbine is operating on hot engine exhaust gas.

Figure 2:
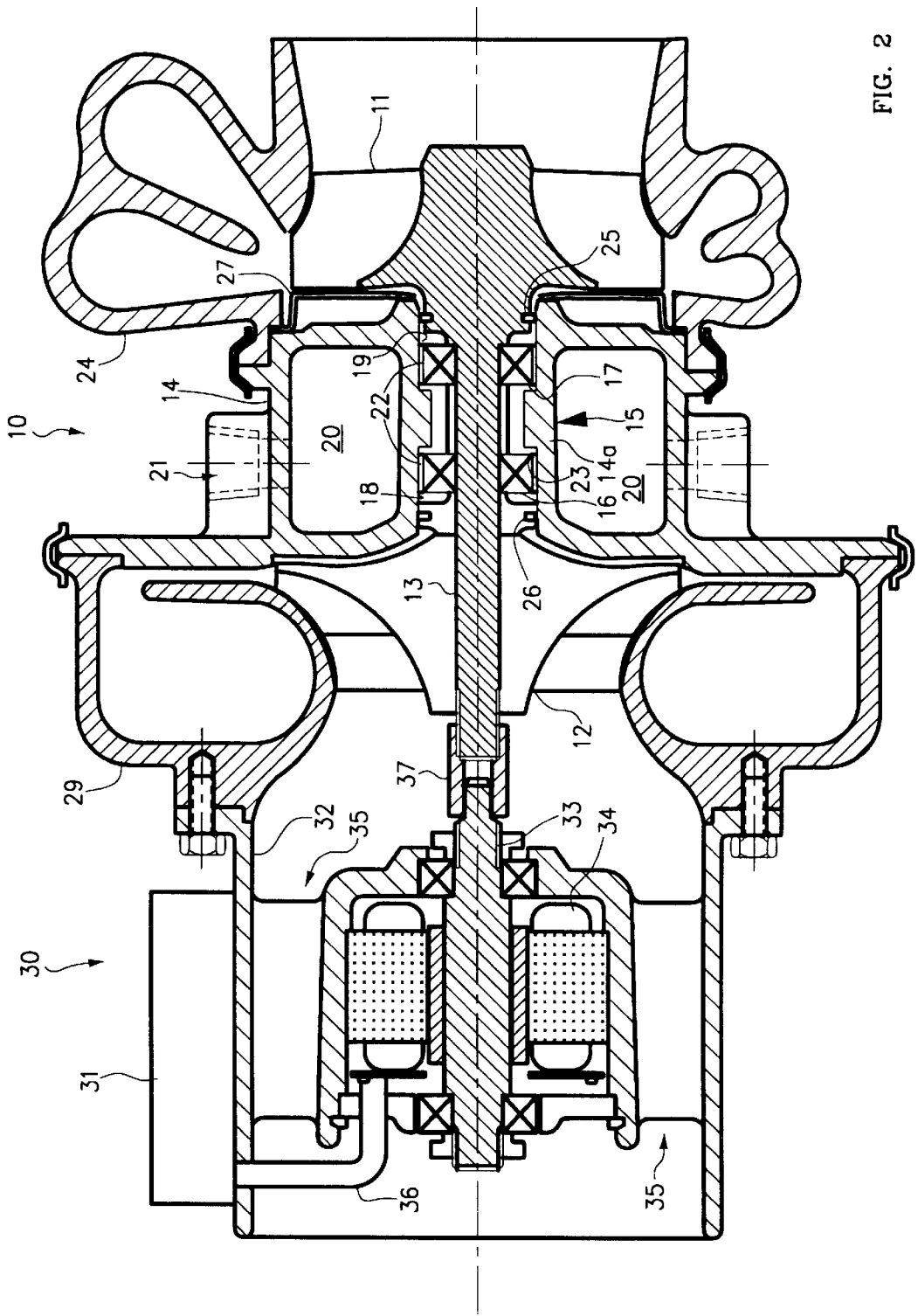
FIG. 2 is a cross-sectional view taken along a plane through the axis of rotation of a unit of the invention, including a compact turbocharger and an electric motor generator.

FIG. 2 illustrates an oil-less, compact turbocharger 10 whose rotatable shaft 13 is solidly connected to an externally mounted motor-generator 30 which has its electronic control 31 mounted directly on the motor housing 32. Referring to FIG. 2, oil-less turbocharger rotor 13 is solidly connected to the rotor 33 of the motor-generator 30. The motor-generator 30 has a permanent magnet rotor 33 and wire-wound coil stator 34, which are known in the art. The motor housing 32 is mounted directly on the compressor casing 29 and incorporates air passages 35 that receive intake air from an air cleaner and directs it into the compressor wheel 12. Electronic control 31 for the motor-generator 30, whose circuitry is well known in the art, is mounted directly on the motor housing 32 and connected to the motor-generator stator 34 by the short cables 36. Solid coupling 37 connects the turbocharger shaft 13 to the rotor 33 of the motor-generator and they remain connected together throughout the entire operating speed range of the turbocharger.

The assembly of FIG. 2 overcomes the problems and complications of prior systems by providing an economical combination of a motor-generator and a compact turbocharger. The external motor-generator 30 is connected to and carried by the turbocharger 10 by fastening the motor housing 32 to the compressor casing 29. The permanent magnet rotor 33 is connected to the turbocharger shaft 13 by a permanent, solid connector 37 and stays connected throughout the entire operating range of the turbocharger 10. The electronic control 31 is mounted on the motor housing 32 and energizes the motor from battery power during the acceleration period of an internal combustion engine up to approximately the torque peak speed; thereafter, at higher speeds, the control 31 allows the generator mode to begin when excess energy is available in the engine exhaust gas. Mounting the electronic control 31 on the motor housing 32 through which intake air for the compression wheel 12 and the internal combustion engine is ducted allows a very short connection between motor stator 34 and controller 31, permitting the engine intake air to cool the control elements and the motor and improving the efficiency of the system.

In prior art charging systems using a motor-driven centrifugal compressor, the compressor must be separately mounted in the engine air intake piping and a bypass valve is necessary to by pass the compressor when the engine turbocharger is capable of supplying sufficient air to the engine to ensure complete combustion in the engine cylinders. The resulting air ducting is complicated and expensive. Furthermore, the motor cannot be used to generate electricity and is disconnected from the vehicle battery by the control after the engine acceleration period.

In systems using a turbocharger with an integral motor-generator designed within the structure of the turbocharger, the amount of power provided by the motor is limited by the small size of the motor components that can be conveniently designed into the internal turbocharger structure.

An externally mounted motor as in the invention can be made appreciable larger in size than an internally mounted motor, can provide much more power to the rotor during acceleration and can utilize more of the excess exhaust gas energy to generate electric current at high turbocharger rotor speeds. Thus, the compact device disclosed in this invention overcomes the complication of mounting a separate motor-driven compressor on the engine to supply air during acceleration, mounts the electronic control close to the motor thereby shortening the electrical leads between the control and motor, and eliminates the necessity of connecting the turbocharger bearing system to the engine lubricating oil system, which eliminates the persistent problem of oil leakage in commercial turbochargers. The compact simplicity of the present invention provides a combination of all essential elements in a single device and results in a less costly and more efficient system compared with other alternatives.

While I have shown and described presently preferred embodiments of the invention, other embodiments may be devised without departing from the scope of the following claims.

What is claimed is:

1. A compact turbocharger, comprising
   a rotatable shaft having an exhaust gas driven turbine wheel at one end and a compressor wheel at the other end,
   a bearing housing surrounding said rotatable shaft, having an inner bearing-engaging portion with bearing engagement surfaces adjacent the turbine wheel and the compressor wheel, an outer housing portion forming, with said inner bearing-engaging portion, a coolant water jacket for cooling said bearing engagement surfaces,
   a pair of anti-friction ball bearings, each of said pair of anti-friction ball bearing being engaged between one of said bearing engagement surfaces of the bearing housing and said rotatable shaft,
   radial springs between said anti-friction ball bearings and said bearing engagement surfaces,
   an exhaust gas volute carried by said bearing housing around said turbine wheel, and
   a compressor casing around the compressor wheel forming a compressor inlet and outlet carried by said bearing housing.

2. The turbocharger of claim 1 wherein said anti-friction ball bearings are angular contact ball bearings.

3. The turbocharger of claim 1 wherein the anti-friction ball bearings are of the deep groove type.

4. The turbocharger of claim 1 wherein the inner bearing engagement portion of the bearing housing is thinner adjacent that two bearing engagement surfaces.

5. The turbocharger of claim 1 further comprising a pair of piston ring seals, one piston ring seal being located between the turbine wheel and one of the anti-friction ball bearings and the other piston ring seal being located between the compressor wheel and the other anti-friction ball bearing.

6. The turbocharger of claim 2 further comprising a high temperature grease between the races of the bearings.

7. The turbocharger of claim 2 further comprising solid film lubricants on the bearing components.

8. The turbocharger of claim 1 wherein the bearing housing includes an opening into the coolant water jacket and is connected to the coolant system of an internal combustion engine.

9. In a turbocharger with a rotatable shaft carrying an exhaust gas-driven turbine and a compressor wheel, a bearing housing and a pair of bearings carrying the rotatable shaft, the improvement wherein the bearing housing forms a coolant jacket and a pair of cooled bearing engagement surfaces in heat transfer relationship with coolant in said coolant jacket, and wherein a first angular contact ball bearing has an inner race engaged with the rotatable shaft, a plurality of ball bearings and an outer race engaged with one of the cooled engagement surfaces to accept thrust in one direction, a second angular contact ball bearing has an inner race engaged with the rotatable shaft, a plurality of ball bearings and an outer race engaged with the other of the cooled engagement surfaces to accept thrust in the direction opposite said one direction, radial springs between the outer races of said angular contract ball bearings, and a spacer between the inner races of said angular contact ball bearings.

10. The turbocharger of claim 9 wherein the bearing housing is thinner between the pair of cooled engagement surfaces and the coolant jacket.

11. The turbocharger of claim 9 wherein the first and second angular contact ball bearings have grease lubricated ceramic balls.

12. The turbocharger of claim 9 wherein the first and second angular contact bearings are closely spaced.

13. The turbocharger of claim 9 further comprising an electric motor-generator having its motor housing mounted on and carried by the turbocharger and having its rotor directly connected to the rotatable shaft of the turbocharger.

14. The turbocharger of claim 13 wherein the motor housing forms the air inlet to the turbocharger compressor and carries the motor stator and an electronic control connected with the stator of the electric motor generator, said motor stator and electronic control being in hear transfer relationship with air flowing through the air inlet.

15. A compact turbocharger-motor generator assembly, comprising
    a rotatable shaft having an exhaust gas driven turbine wheel at one end and a compressor wheel at the other end,
    a bearing housing surrounding said rotatable shaft, having an inner bearing engaging portion with bearing engagement surfaces adjacent the turbine wheel and the compressor wheel, an outer housing portion forming, with said inner bearing engaging portion, a coolant water jacket for cooling said bearing engagement surfaces,
    a pair of anti-friction ball bearings, each of said pair of anti-friction ball bearings being engaged between one of said engagement surfaces of the bearing housing and said rotatable shaft,
    radial springs between said anti-friction ball bearings and said bearing engagement surfaces,
    an exhaust gas volute carried by said bearing housing around said turbine wheel,
    a compressor casing forming a compressor inlet and outlet carried by said bearing housing; and
    an electric motor-generator having a motor housing connected to and carried by the compressor casing and a rotor connected to the turbocharger shaft.

16. The compact turbo-charger motor generator assembly of claim 15 wherein the motor housing forms an inlet to the compressor wheel of the turbocharger with surfaces in heat transfer relationship with the motor stator and control.

17. The turbocharger of claim 15 wherein said anti-friction ball bearings are angular contact ball bearings with a full complement of ceramic balls, and said bearing engagement surfaces and angular contact anti-friction ball bearings are closely spaced.

18. The turbocharger of claim 15 wherein the inner bearing engagement portion of the bearing housing is thinner adjacent the two bearing engagement surfaces.

19. The turbocharger of claim 2 wherein the angular contact anti-friction ball bearings have a full complement of ceramic balls.

* * * * *